(12) United States Patent
Willey et al.

(10) Patent No.: US 11,575,228 B2
(45) Date of Patent: Feb. 7, 2023

(54) HELICAL STRAIN RELIEF FOR ELECTRICAL CONDUCTORS, FIBER OPTIC CABLES, OR OTHER CABLES

(71) Applicant: Raytheon Company, Waltham, MA (US)

(72) Inventors: Peter M. Willey, Rumford, RI (US); Curtis B. Carlsten, Seekonk, MA (US); John C. Cochran, Portsmouth, RI (US)

(73) Assignee: Raytheon Company, Waltham, MA (US)

( * ) Notice: Subject to any disclaimer, the term of this patent is extended or adjusted under 35 U.S.C. 154(b) by 182 days.

(21) Appl. No.: 16/940,195

(22) Filed: Jul. 27, 2020

(65) Prior Publication Data

US 2022/0029350 A1 Jan. 27, 2022

(51) Int. Cl.
*H01R 13/56* (2006.01)
*F16F 15/04* (2006.01)
*F16L 3/12* (2006.01)
*F16M 13/02* (2006.01)
*G02B 6/44* (2006.01)
*H02G 15/064* (2006.01)

(52) U.S. Cl.
CPC .......... *H01R 13/562* (2013.01); *F16F 15/04* (2013.01); *F16L 3/1218* (2013.01); *F16M 13/022* (2013.01); *G02B 6/4458* (2013.01); *G02B 6/4477* (2013.01); *H02G 15/064* (2013.01)

(58) Field of Classification Search
CPC .... H02G 11/00; H02G 15/064; G02B 6/4471; G02B 6/4453; G02B 6/4454; G02B 6/4478; G02B 6/4458; G02B 6/4477; H01R 13/562; F16F 15/04; F16L 3/1218; F16M 13/022
See application file for complete search history.

(56) References Cited

U.S. PATENT DOCUMENTS

| | | | | |
|---|---|---|---|---|
| 2,880,992 A | * | 4/1959 | Gubernick | F16F 1/06 267/74 |
| 2,955,149 A | * | 10/1960 | Gubernick | H02G 11/00 267/74 |
| 4,319,802 A | * | 3/1982 | Bowes | G02B 6/3887 385/136 |
| 4,567,319 A | * | 1/1986 | Finley | H01B 7/0072 138/122 |
| 4,883,337 A | | 11/1989 | Dahlgren | |
| 4,900,123 A | | 2/1990 | Barlow et al. | |

(Continued)

FOREIGN PATENT DOCUMENTS

| | | | |
|---|---|---|---|
| CN | 101552448 A | * | 10/2009 |
| CN | 101552448 A | | 10/2009 |

(Continued)

OTHER PUBLICATIONS

International Search Report and Written Opinion of the International Searching Authority dated Jul. 19, 2021 in connection with International Patent Application No. PCT/US2021/029213, 10 pages.

*Primary Examiner* — Michelle R Connelly
*Assistant Examiner* — Shojan P Pavunny

(57) ABSTRACT

An apparatus includes a strain relief formed in helical shape and formed with a U-shaped channel. The strain relief can be used around a cable of a component or a spool extension of a fiber tray.

20 Claims, 4 Drawing Sheets

(56) References Cited

U.S. PATENT DOCUMENTS

| | | | |
|---|---|---|---|
| 5,050,813 A * | 9/1991 | Ishikawa | H02G 11/00 |
| | | | 24/910 |
| 5,074,635 A | 12/1991 | Justice et al. | |
| 5,323,480 A | 6/1994 | Mullaney et al. | |
| 5,367,598 A | 11/1994 | Devenish, III et al. | |
| 5,402,515 A | 3/1995 | Vidacovich et al. | |
| 5,791,638 A * | 8/1998 | Balsells | F16F 1/123 |
| | | | 267/167 |
| 6,111,820 A | 8/2000 | Ames | |
| 6,424,784 B1 | 7/2002 | Olson | |
| 7,027,695 B2 | 4/2006 | Cooke et al. | |
| 7,055,812 B2 * | 6/2006 | Balsells | F16F 1/045 |
| | | | 267/167 |
| 7,369,716 B2 | 5/2008 | Berg et al. | |
| 3,066,033 A1 | 11/2011 | Quigley et al. | |
| 8,755,660 B1 | 6/2014 | Minelly | |
| 2002/0172461 A1 | 11/2002 | Singer et al. | |
| 2004/0013387 A1 | 1/2004 | Wakileh et al. | |
| 2007/0036506 A1 | 2/2007 | Kewitsch | |
| 2015/0253513 A1 | 9/2015 | Stone et al. | |
| 2018/0069386 A1 * | 3/2018 | Keen | H02G 11/00 |

FOREIGN PATENT DOCUMENTS

| | | | | |
|---|---|---|---|---|
| DE | 4317636 C1 * | 9/1994 | | B25J 19/0025 |
| EP | 3293844 A1 | 3/2018 | | |

* cited by examiner

_US 11,575,228 B2_

HELICAL STRAIN RELIEF FOR ELECTRICAL CONDUCTORS, FIBER OPTIC CABLES, OR OTHER CABLES

TECHNICAL FIELD

This disclosure is generally directed to strain relief for cables. More specifically, this disclosure is directed to helical strain relief for electrical conductors, fiber optic cables, or other cables.

BACKGROUND

When terminating electrical conductors or fiber optic cables that need to mate to another cable or circuit card assemblies (CCAs), excess length is used to ensure that the connection can be made and that there will be proper strain relief to not cause a failure while manipulating into place. This excess length must be routed and secured so no damage will occur due to shock/vibration/handling after the connection has been made and the part has put into service.

SUMMARY

This disclosure provides a helical strain relief for electrical conductors, fiber optic cables, or other cables.

In a first embodiment, an apparatus for relieving strain is provided. The apparatus includes a strain relief formed in a helical shape and formed with a U-shaped channel.

In a second embodiment, a system for relieving strain is provided. The system includes a component and a strain relief. The component includes a cable. The strain relief formed in a helical shape around the cable and formed with a U-shaped channel.

In a third embodiment, a system for relieving strain is provided. The system includes a fiber tray and a strain relief. The component includes a spool extension. The strain relief formed in a helical shape around the spool extension and formed with a U-shaped channel.

Other technical features may be readily apparent to one skilled in the art from the following figures, descriptions, and claims.

BRIEF DESCRIPTION OF THE DRAWINGS

For a more complete understanding of this disclosure and its features, reference is now made to the following description, taken in conjunction with the accompanying drawings, in which.

DETAILED DESCRIPTION

FIGS. 1 through 7, described below, and the various embodiments used to describe the principles of the present invention in this patent document are by way of illustration only and should not be construed in any way to limit the scope of the invention. Those skilled in the art will understand that the principles of the present invention may be implemented in any type of suitably arranged device or system.

For electrical conductors, some techniques use a clamp or zip tie to ensure an adequate service loop so as to not strain the cable. For fiber optic cables, the excess fiber length is wound and secured in a tray and the splice or connector secured in the tray. When the fiber is terminated in a connector on a CCA, a tray is also generally used to take up the fiber length, and the fiber exits the tray to make the connection.

The strain relief uses a U-shaped channel helical spring to hold, protect and strain relieve the conductors or fibers. The conductors or fibers are wound in the U-shaped channel and can be manipulated in any direction without adding additional strain. The invention has a particular advantage when used in blind mates to ensure proper strain relief and that no pinching of the conductor or fiber occurs. The U-shaped channel spring can be hard mounted or fit over an existing cable. It can be modified to fit any diameter or number of conductors, or any minimum bend radius requirements. The design lends itself well to be additively manufactured so new geometries can be easily produced, including variable pitches or predefined bends to simplify routing in any design.

Figure 1:
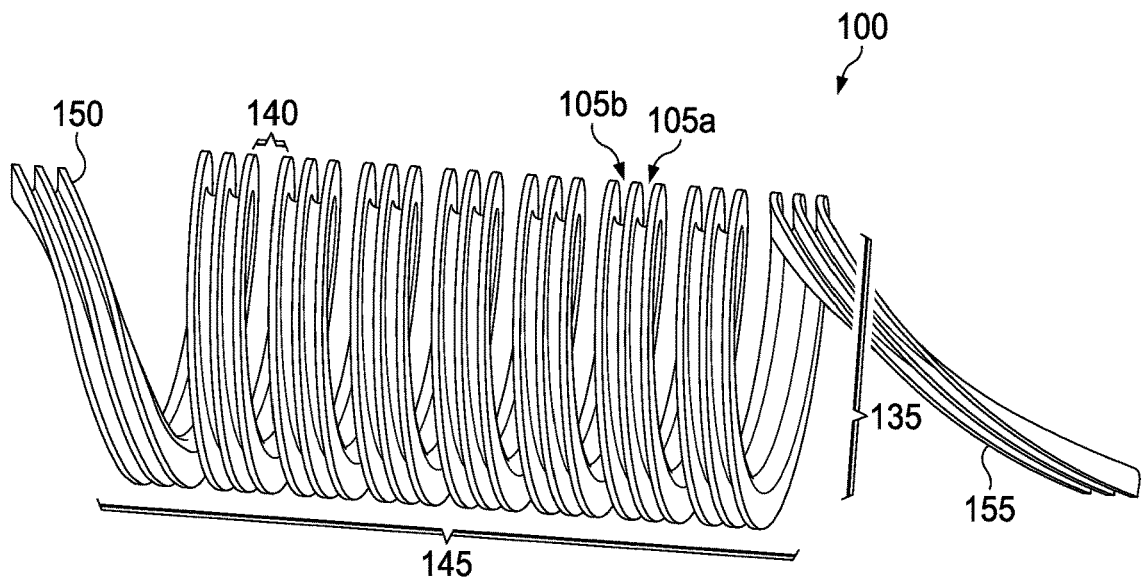
FIG. 1 illustrates a strain relief with multiple channels in accordance with this disclosure.
Figure 2:
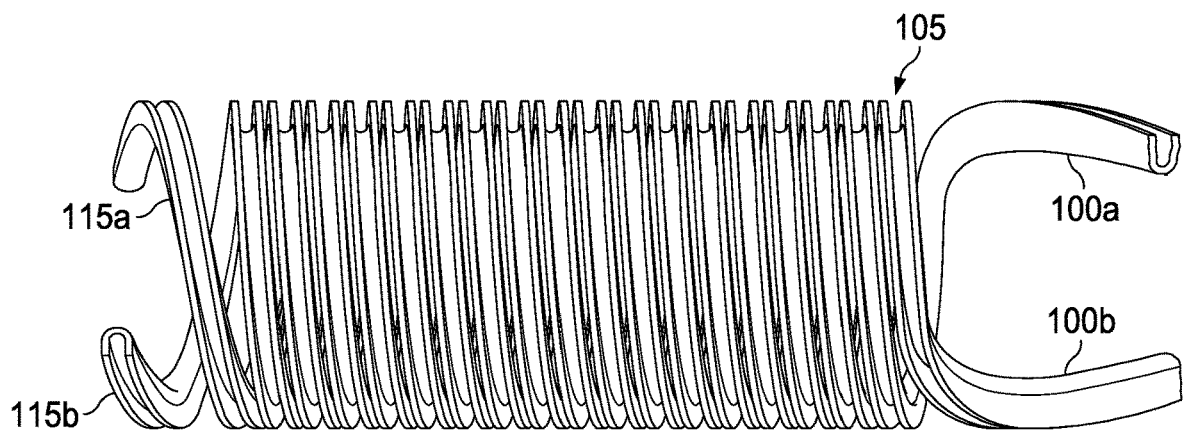
FIG. 2 illustrates multiple strain reliefs and interleaved together for multiple conductors in accordance with this disclosure.
Figure 3:
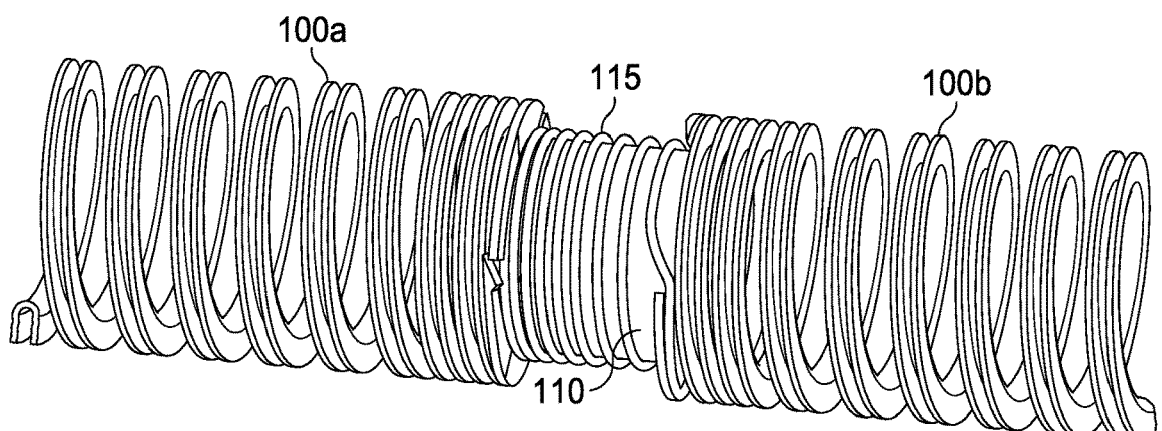
FIG. 3 illustrates a solid mandrel for excess wire with a strain relief 100a and 100b connected on each side in accordance with this disclosure.
Figure 4:
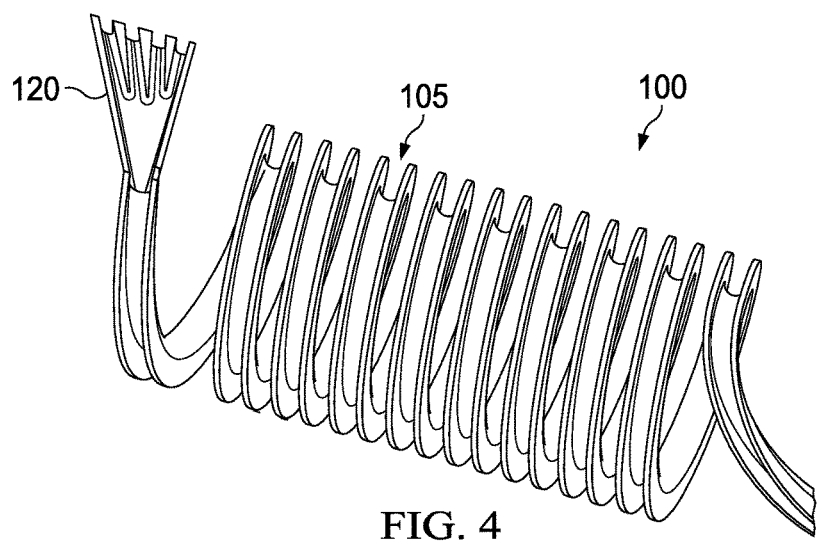
FIG. 4 illustrates a strain relief with a multi-exit in accordance with this disclosure.
Figure 5A:
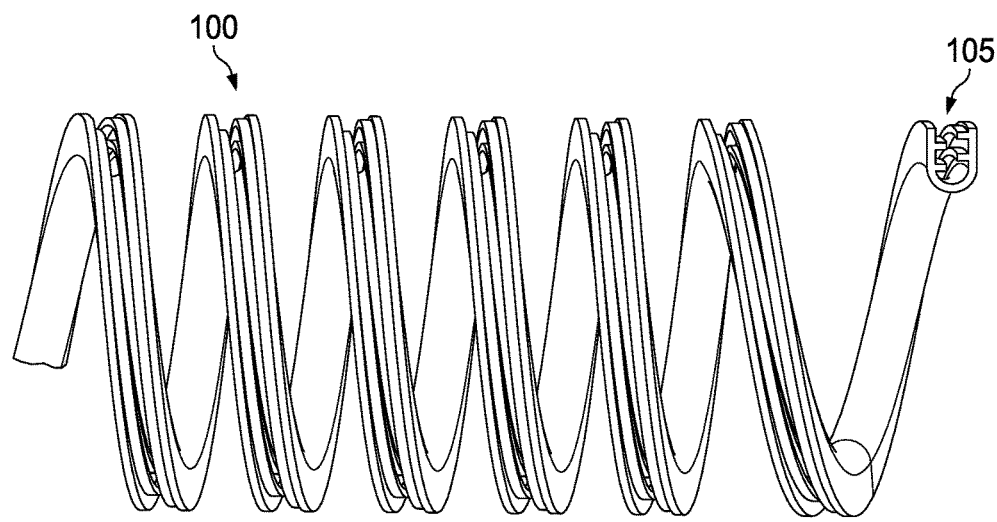
FIGS. 5A and 5B illustrate a strain relief with multiples partitions in accordance with this disclosure.
Figure 5B:
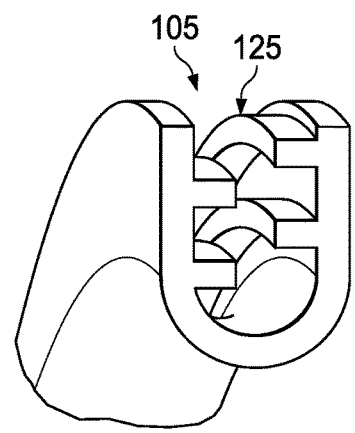
Figure 6:
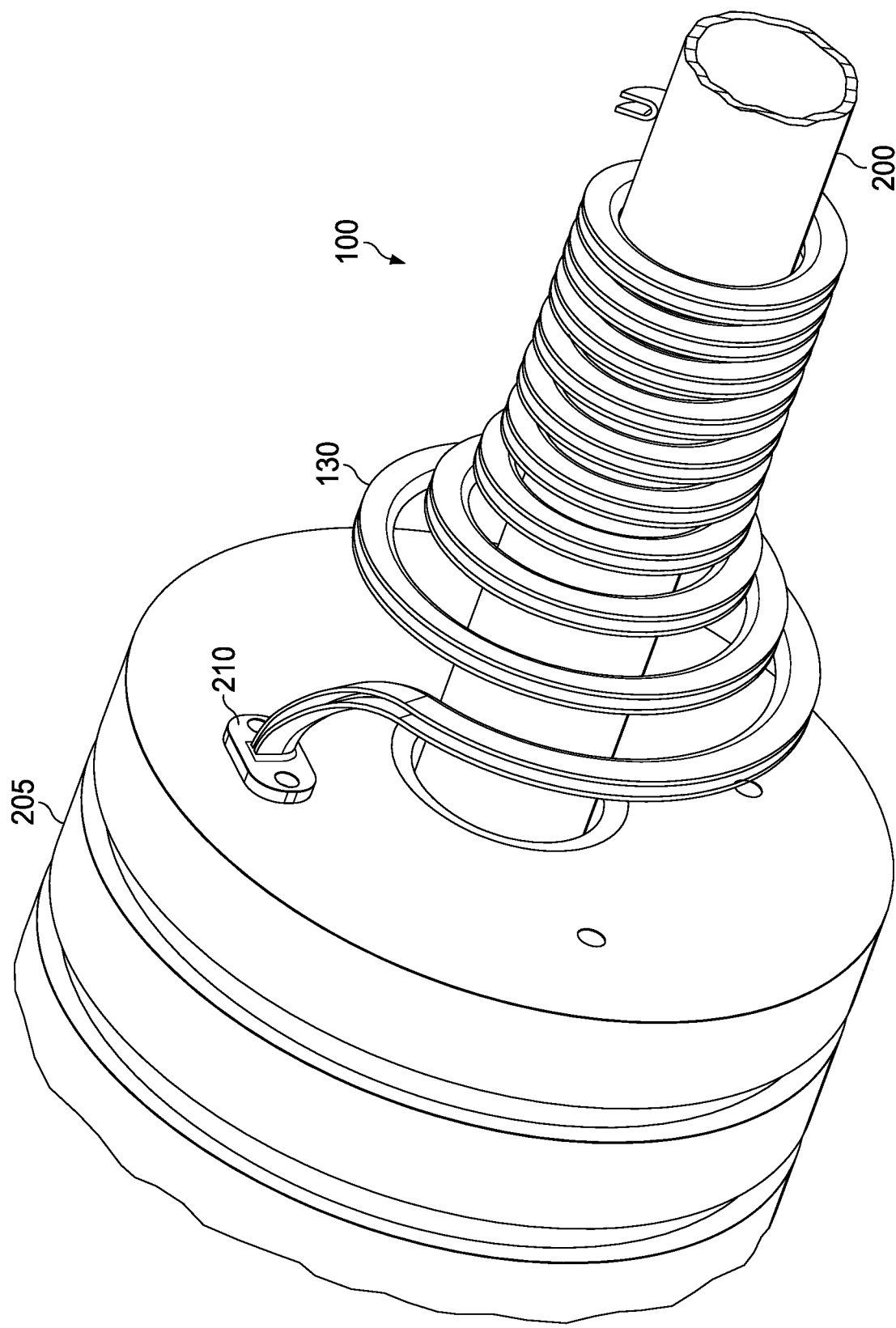
FIG. 6 illustrates a strain relief with a transition applied on a cable 200 connected to a component.
Figure 7:
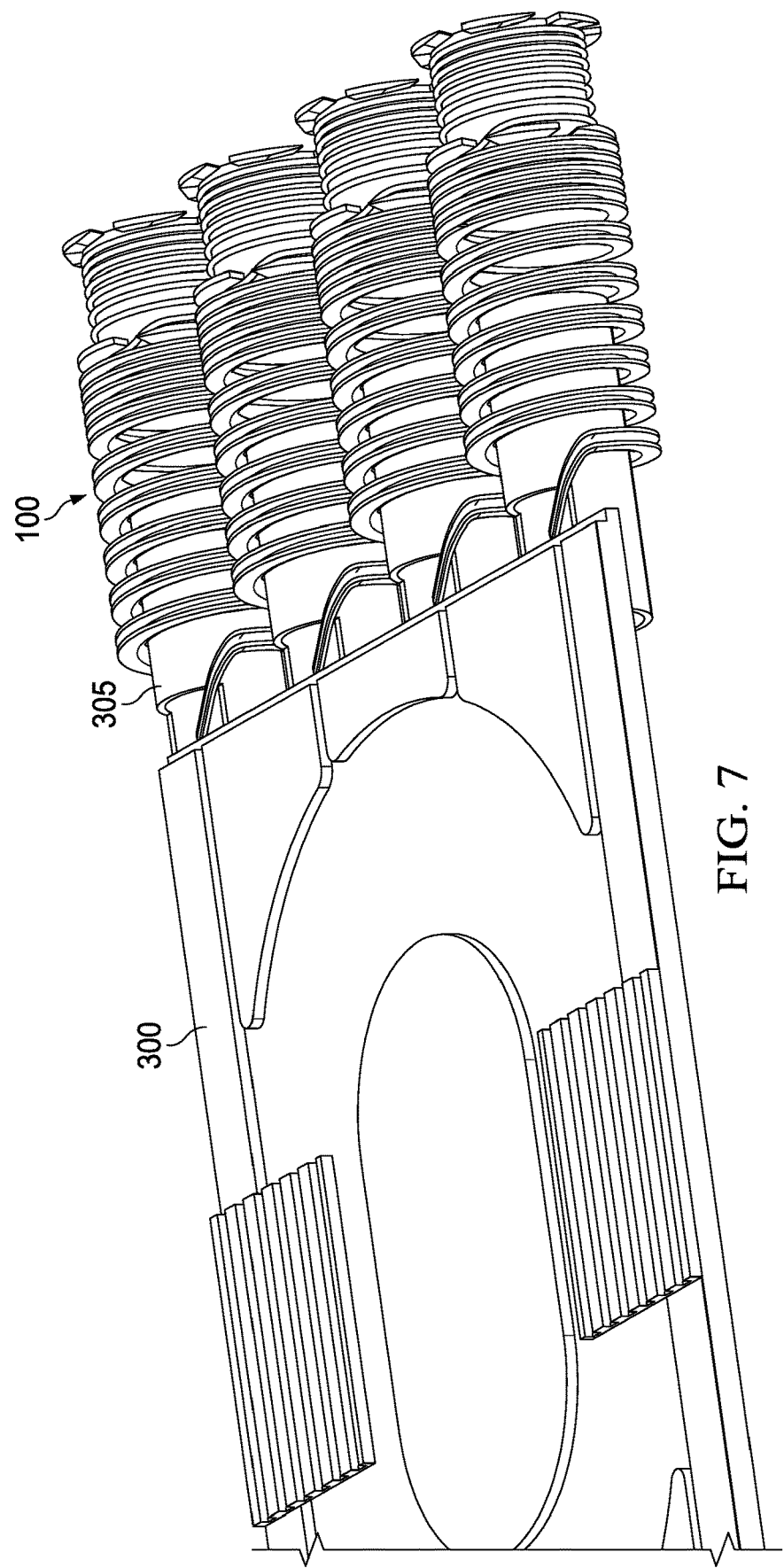
FIG. 7 illustrates multiple strain reliefs connected to a fiber tray in accordance with this disclosure.

FIGS. 1-7 illustrate examples of U-shaped channel helical spring strain reliefs 100 in accordance with this disclosure. In particular, FIG. 1 illustrates a strain relief 100 with multiple channels 105, FIG. 2 illustrates multiple strain reliefs 100a and 100b interleaved together for multiple conductors, FIG. 3 illustrates a solid mandrel 110 for excess wire 115 with a strain relief 100a and 100b connected on each side, FIG. 4 illustrates a strain relief 100 with a multi-exit 120, FIGS. 5A and 5B illustrate a strain relief 100 with multiples partitions 125, FIG. 6 illustrates a strain relief 100 with a transition 130 applied on a cable 200 connected to a component 205, and FIG. 7 illustrates multiple strain reliefs 100 connected to a fiber tray 300. The embodiments of FIGS. 1-7 are for illustration only and the strain reliefs 100 may be used in any suitable device or system.

Properly relieving strain on the electrical conductors and fiber optic cable when routing and terminating is critical. The proper strain relieving is difficult when routing occurs in tight spaces when blind mates are needed or when an assembly is subject to conditions where motion will cause excessive stress or strain on the cables. The strain relief 100 is structured as a U-shaped channel helical spring to hold, protect and strain relieve the conductions or fibers. The helical spring configuration allows for reduced materials for a wire guide and reduced area required for storing any excess wire.

The strain relief 100 can relieve electrical conductors and fiber conductors when routing and terminating. The strain relief 100 structure lends itself well to be additively manufactured allowing different geometries to be easily produced, including variable pitches or predefined bends to simplify routing in any design. For simplicity of discussion, the term "wire" will be used to refer to optical cables, fibers, or other wires with which the strain relief 100 can be utilized.

As shown in FIG. 1, a strain relief 100 can include multiple channels 105a and 105b. The quantity of the multiple U-shaped channels 105 can be designed based on an amount of wires, an amount of destinations of the wires, etc. The amount of the channels 105 can be two or more depending on the design constraints of the system in which the strain relief 100 is applied.

The strain relief 100 can have a mean diameter 135 based on a diameter of a cable or spool extension that the strain relief 100 is designed to surround. The mean diameter 135 can be larger than an outer diameter of the cable or the spool extension.

The strain relief 100 can have a pitch or coil gap 140 based on the application around a cable or spool extension. For example, a spool extension may have less flexibility and therefore the strain relief 100 can be designed with a narrow coil gap.

The first channel 105a and the second channel 105b can have different body lengths 145 depending on a beginning 150 and an end 155 of each channel 105. The beginning 150 can be a part of the strain relief 100 from where a wire 115 is routed through the channel 105. The end 155 can be where a wire is connected to a component or fed into a component.

The first channel 105a and the second channel 105b can also have different dimensions for the U-shape. For example, the first channel 105a can be wider than the second channel 105b. The first channel 105a could be deeper than the second channel 105b.

For convenience, the strain reliefs 100 will be described as having a U-shaped channel 105. However, any quantity of U-shaped channels 105 can be implemented in the following embodiments of FIGS. 2-7.

As shown in FIG. 2, multiple strain reliefs 100 are interleaved together for multiple wires 115. For example, a first strain relief 100a could be designed for one or more first wires 115a and a second strain relief 100b could be designed for one or more second wires 115b. The first strain relief 100a and the second strain relief 100b could be designed with a different quantity of wires 115.

A first strain relief 100a and a second strain relief 100b can be designed with coil gaps 140 that are slightly larger than a width of the coil. This would ensure that the first strain relief 100a and the second strain relief 100b could be properly interleaved. In embodiments where the first strain relief 100a and the second strain relief 100b are designed for different numbers of wires 115, the coil gap 140 of the first strain relief 100a could be based on the coil width of the second strain relief 100b and the coil gap 140 of the second strain relief 100b could be based on the coil width of the first strain relief 100a.

The body length 145 of the first strain relief 100a can be different from a body length 145 of the second strain relief 100b. The body lengths 145 can be based on the application of the strain relief 100.

In embodiments with multiple U-shaped channels 105, the strain reliefs 100a and 100b could include a first channel 105a and a second channel 105b. This could include one of the first strain relief 100a and the second strain relief 100b having multiple channels 105 while the other of the first strain relief 100a and the second strain relief 100b has a single channel 105.

As shown in FIG. 3, a solid mandrel 110 includes a strain relief 100 connected on each side. In certain embodiments, the solid mandrel 110 may only have a strain relief 100 connected on one side. In applications where the strain relief 100 provides sufficient relief of strain and stress on a wire, a solid mandrel 110 can be applied for any further excess wire 115. A diameter of the solid mandrel 110 should be less than the mean diameter 135 of the strain relief 100.

As shown in FIG. 4, a strain relief 100 could include a multi-exit 120. The multi-exit 120 is designed based on the number of wires that the strain relief 100 is designed to accommodate. The multi-exit 120 can be a branched channel, which begins as a single channel and branches into multiple channels. The wires 115 in the channel 105 of the strain relief 100 can be guided into separate branched channels of the multi-exit 120. In some embodiments, multiple wires 115 can share a single branched channel of the multi-exit 120.

In embodiments with multiple U-shaped channels 105, a first channel 105a and a second channel 105b could include different numbers of exits in a multi-exit 120. This could include one of the first channel 105a and the second channel 105b including the multi-exit 120 while the other of the first channel 105a and the second channel 105b not having a multi-exit 120.

As shown in FIGS. 5A and 5B, a strain relief 100 includes multiple partitions 125. Each partition 125 can be long enough to secure a wire 115 into different portions of the channel 105. The partitions 125 can provide separation between each wire 115 without requiring an extra channel 105. While an extra channel 105 may not be required, certain embodiments can include partitions 125 and multiple channels 105.

In embodiments with multiple U-shaped channels 105, a first channel 105a and a second channel 105b could include different numbers of partitions 125. This could include one of the first channel 105a and the second channel 105b including one or more partitions 125 while the other of the first channel 105a and the second channel 105b not having any partitions 125.

As shown in FIG. 6, a strain relief 100 includes a transition 130 applied on a cable 200 connected to a component 205. The strain relief 100 is secured on a cable 200 by designing the mean diameter 135 according to a diameter of the cable 200. A wire 115 secured in the strain relief 100 is normally attached to the component 205 at a connection 210 that is not located close to the cable 200. A transition 130 of the strain relief 100 can be designed based on a distance from the outside of the cable 200 to the connection 210. A mean diameter 135 of the transition 130 can change based on stress and strain constraints of the wire 115. The transition 130 can be constant or variable.

As shown in FIG. 7, multiple strain reliefs 100 are connected to a fiber tray 300. The fiber tray 300 can include one or more spool extensions 305. Each spool extension 305 can be designed to secure a strain relief 100.

Although FIG. 1-7 illustrate examples of U-shaped channel helical spring strain reliefs 100, various changes may be made to FIGS. 1-7. For example, the strain reliefs 100 could have a transition 130 on both sides and be used in conjunction with any suitable number(s) and type(s) of components and systems. As noted above the examples of the strain reliefs 100 in FIGS. 1-7 are for illustration only.

It may be advantageous to set forth definitions of certain words and phrases used throughout this patent document. The terms "include" and "comprise," as well as derivatives thereof, mean inclusion without limitation. The term "or" is inclusive, meaning and/or. The phrase "associated with," as well as derivatives thereof, may mean to include, be included within, interconnect with, contain, be contained within, connect to or with, couple to or with, be communicable with, cooperate with, interleave, juxtapose, be proximate to, be bound to or with, have, have a property of, have a relationship to or with, or the like. The phrase "at least one of," when used with a list of items, means that different combinations of one or more of the listed items may be used, and only one item in the list may be needed. For example, "at least one of: A, B, and C" includes any of the following combinations: A, B, C, A and B, A and C, B and C, and A and B and C.

The description in the present application should not be read as implying that any particular element, step, or function is an essential or critical element that must be included in the claim scope. The scope of patented subject matter is defined only by the allowed claims. Moreover, none of the claims invokes 35 U.S.C. § 112(f) with respect to any of the appended claims or claim elements unless the exact words "means for" or "step for" are explicitly used in the particular claim, followed by a participle phrase identifying a function. Use of terms such as (but not limited to) "mechanism," "module," "device," "unit," "component," "element," "member," "apparatus," "machine," "system," "processor," or "controller" within a claim is understood and intended to refer to structures known to those skilled in the relevant art, as further modified or enhanced by the features of the claims themselves, and is not intended to invoke 35 U.S.C. § 112(f).

While this disclosure has described certain embodiments and generally associated methods, alterations and permutations of these embodiments and methods will be apparent to those skilled in the art. Accordingly, the above description of example embodiments does not define or constrain this disclosure. Other changes, substitutions, and alterations are also possible without departing from the spirit and scope of this disclosure, as defined by the following claims.

What is claimed is:

1. An apparatus including:
   a strain relief formed as a U-shaped channel extending in a helical shape and including a first partition partially extending from an inside of the U-shaped channel towards a surface of the U-shaped channel.

2. The apparatus of claim 1, wherein the strain relief is a helical spring.

3. The apparatus of claim 1, wherein the strain relief is formed with multiple U-shaped channels.

4. The apparatus of claim 1, further comprising:
   a second strain relief formed in a helical shape and including at least one channel, wherein the second strain relief is interleaved with the strain relief.

5. The apparatus of claim 1, further comprising:
   a solid mandrel connected to an end of the strain relief.

6. The apparatus of claim 1, wherein the strain relief includes a multi-exit from the U-shaped channel.

7. The apparatus of claim 1, further comprising:
   a second partition partially extending from the inside of the U-shaped channel in an opposite direction from the first partition.

8. A wire-relieving system including:
   a component with a cable; and
   a strain relief coupled to the component and formed as a U-shaped channel extending in a helical shape around the cable, wherein the U-shaped channel includes a first partition.

9. The system of claim 8, wherein the strain relief is a helical spring.

10. The system of claim 8, wherein the strain relief is formed with multiple U-shaped channels.

11. The system of claim 8, further comprising:
    a second strain relief formed in a helical shape and including at least one channel, wherein the second strain relief is interleaved with the strain relief.

12. The system of claim 8, further comprising:
    a solid mandrel connected to an end of the strain relief.

13. The system of claim 8, wherein the strain relief includes a multi-exit.

14. The system of claim 8, wherein the strain relief further comprises a second partition.

15. A wire-relieving system including:
    a fiber tray with a spool extension; and
    a strain relief formed in a helical shape around the spool extension and formed with a U-shaped channel.

16. The system of claim 15, wherein the strain relief is a helical spring formed with multiple U-shaped channels.

17. The system of claim 15, further comprising:
    a second strain relief formed in a helical shape and including at least one channel, wherein the second strain relief is interleaved with the strain relief.

18. The system of claim 15, further comprising:
    a solid mandrel connected to an end of the strain relief.

19. The system of claim 15, wherein the strain relief includes a multi-exit.

20. The system of claim 15, wherein the U-shaped channel includes at least one partition.

* * * * *